June 2, 1925.
L. M. SEAMAN
PIPE COUPLING
Filed March 2, 1921
1,540,504
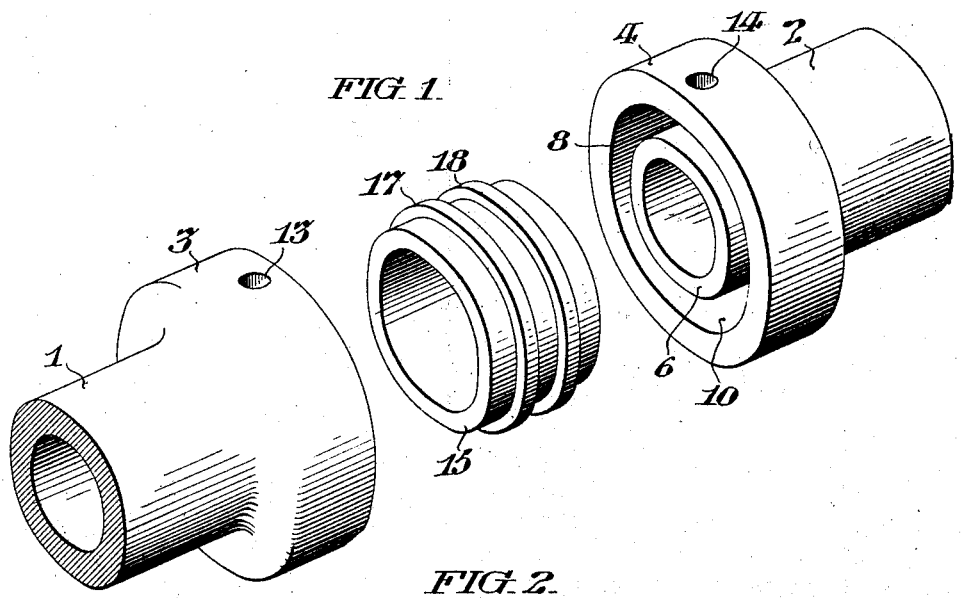
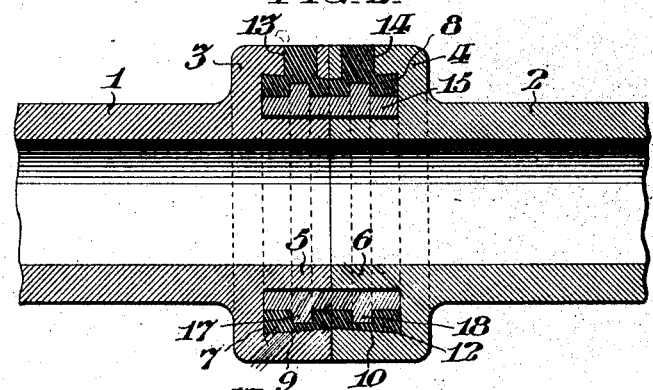
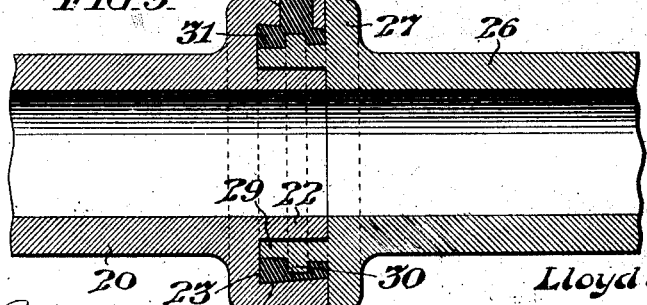
Inventor
Lloyd M. Seaman,
By Clifton C. Calwell
Attorney
Witness
William J. Russell Patented June 2, 1925.

1,540,504

UNITED STATES PATENT OFFICE.

LLOYD M. SEAMAN, OF PLEASANTVILLE, NEW JERSEY.

PIPE COUPLING.

Application filed March 2, 1921. Serial No. 449,028.

*To all whom it may concern:*

Be it known that I, LLOYD M. SEAMAN, a citizen of the United States, and a resident of Pleasantville, in the county of Atlantic, State of New Jersey, have invented certain new and useful Improvements in Pipe Couplings, of which the following is a specification, reference being had to the accompanying drawings.

My invention relates particularly to means for effecting a fluid tight connection between the ends of adjacent pipe sections, and is especially directed to sewer pipes or other subterranean conduits.

It is well known that such pipes are subjected to detrimental conditions, incident to the settlement of the soil through which they extend, which tend to force the pipe sections out of alinement and thereby cause them to leak at the joints.

The principal objects of my invention are to provide a coupling which will in effect render the pipe sections substantially integral with each other, and afford a joint that will not leak when subjected to tensional strains.

Other objects of my invention are to provide a pipe coupling that is so constructed and arranged as to preserve the continuity of the fluid conveying bore, and thereby avoid eddy forming pockets.

My invention further comprehends a pipe coupling having a union sleeve cooperative with a sealing medium to form an integral joint between adjacent pipe sections.

The form of my invention as hereinafter described comprises pipe sections having bell shaped flanges embracing the end nipples and forming annular undercut pockets, into which a splicing ring may be fitted to form a union sleeve for said end nipples, said splicing ring having annular flanges with which plastic material, introduced into said pockets through suitably provided inlets, may be interlocked to bind the pipe sections in substantially integral relation, and thereby seal the joint between said pipe sections.

My invention also includes all of the various novel features of construction and arrangement as hereinafter more definitely specified.

In the accompanying drawings Figure 1, is a perspective view of the component parts of a coupling conveniently embodying my invention, and comprising the splicing ring or union sleeve, and the opposed end portions or nipples of adjacent pipe sections, separated for convenience of illustration; Fig. 2, is a central vertical longitudinal sectional view of the assembled coupling; and Fig. 3, is a central vertical longitudinal sectional view of an assembled coupling showing a modification of the invention illustrated in Figs. 1 and 2.

In the form of my invention shown in Figs. 1 and 2, the pipe sections 1 and 2, are respectively provided with the bell-shaped flanges 3 and 4, embracing the end nipples 5 and 6 to form pockets 7 and 8 whose walls 9 and 10 incline to form a restricted mouth in each, as best shown in Fig. 2 of the drawing.

When the ends of the pipe sections 1 and 2 are abutted as shown in Fig. 2, the pockets 7 and 8 afford a chamber for the reception of any suitable plastic material such as pitch asphaltum, cement or other sealing medium 12, which may be conveniently inserted through suitably provided inlet apertures 13 and 14 in the respective bell-shaped flanges 3 and 4, clearly shown in Figs. 1 and 2.

The splicing ring or union sleeve 15 having the annular radially extended flanges 17 and 18, respectively disposed in the pockets 7 and 8, forms a thimble for the end nipples 5 and 6 of the pipe sections 1 and 2, and being embedded in the sealing medium 12 cooperates therewith to form a fluid tight joint, and to prevent axial separation of the pipe sections 1 and 2.

In the form of my invention, shown in Fig. 3, the pipe section 20 has the bell-shaped flange 21 embracing the end nipple 22 and forming the pocket 23 whose wall 25 inclines to provide a restricted mouth.

The pipe section 26 has the radially extended flange 27 arranged to abut against the ends of the bell-shaped flange 21 and nipple 22, and has the union sleeve 29 formed in unitary relation therewith and arranged to slip over the nipple 22. Said union sleeve 29 is provided with the radially extended flange 30, and is arranged to be embedded in the sealing material 31, introduced into the pocket 23 through the inlet aperture 32.

My invention is advantageous in that when the sealing medium sets in the pockets formed by the bell-shaped flanges, any tendency of the pipe sections to separate longitudinally will tend to cause said sealing medium to more intimately engage the inclined or conical walls of said pockets and thereby not only tightly seal the joint between the ends of the pipe sections but will also prevent the disconnection of said pipe sections.

I do not desire to limit my invention to the precise details of construction and arrangement as herein set forth as it is obvious that various modifications may be made therein without departing from the essential features of my invention as defined in the appended claims.

Having thus described my invention, I claim:—

1. A pipe coupling comprising abutted pipe sections each having end nipples embraced by bell-shaped flanges forming an annular pocket, for the reception of sealing material, and a thimble for said nipples, arranged to be embedded in said sealing material.

2. A pipe coupling comprising abutted pipe sections each having opposed end nipples embraced by bell-shaped flanges forming undercut annular pockets which provide a chamber for the reception of sealing material, and a thimble for said nipples, arranged to be embedded in said sealing material.

3. A pipe coupling comprising abutted pipe sections having similar ends comprising opposed end nipples embraced by bell-shaped flanges forming annular pockets, and having apertures in the walls thereof for the introduction of sealing material into the chamber formed by said pockets.

4. A pipe coupling comprising abutted pipe sections having similar ends comprising opposed end nipples and bell-shaped flanges provided with conical inner walls affording annular pockets, forming a chamber for the reception of sealing material introduced through suitable inlet apertures in said flanges.

5. A pipe coupling comprising abutted pipe sections having opposed end nipples embraced by bell-shaped flanges forming annular pockets and providing a chamber for sealing material, and a thimble for said nipples formed separate from said sections, and having projections arranged to be embedded in said sealing material.

6. A pipe coupling comprising abutted pipe sections having opposed end nipples embraced by bell-shaped flanges forming annular undercut pockets and providing a chamber for sealing material, and a thimble for said nipples formed separate from said sections, and having flanges arranged to be embedded in said sealing material.

7. A pipe coupling comprising abutted pipe sections each having end nipples embraced by bell-shaped flanges forming an annular pocket, for the reception of sealing material inserted through apertures in said flanges, and a thimble in said sealing material arranged to bridge the joint formed by the abutted ends of said nipples and flanges and having ribs substantially in registry with the apertures in said flanges.

In witness whereof, I have hereunto set my hand this 23rd day of February, A. D., 1921.

LLOYD M. SEAMAN.

Witnesses.
WILLIAM DAVID PEOPLES,
EDWIN BLACKMAN YORK.